United States Patent
Paul et al.

(10) Patent No.: US 9,823,146 B2
(45) Date of Patent: Nov. 21, 2017

(54) AXIAL FLUX FOCUSING SMALL DIAMETER LOW COST TORQUE SENSOR

(71) Applicant: Steering Solutions IP Holding Corporation, Saginaw, MI (US)

(72) Inventors: Subhra Paul, Saginaw, MI (US); Mohammed R. Islam, Saginaw, MI (US); Jeffery A. Zuraski, Saginaw, MI (US); Keith A. Kidder, Saginaw, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 173 days.

(21) Appl. No.: 14/623,733

(22) Filed: Feb. 17, 2015

(65) Prior Publication Data

US 2016/0238470 A1    Aug. 18, 2016

(51) Int. Cl.
*G01L 3/10* (2006.01)
*G01L 5/22* (2006.01)

(52) U.S. Cl.
CPC .............. *G01L 3/101* (2013.01); *G01L 3/104* (2013.01); *G01L 5/221* (2013.01)

(58) Field of Classification Search
CPC .......... G01L 3/101; G01L 3/104; G01L 5/221
USPC .................................................... 73/862.193
See application file for complete search history.

(56) References Cited

U.S. PATENT DOCUMENTS

| | | | | |
|---|---|---|---|---|
| 3,051,988 A | * | 9/1962 | Baermann et al. | ... B29C 47/126 210/222 |
| 7,602,173 B2 | * | 10/2009 | Reichert | ................. G01L 5/221 324/207.13 |
| 2011/0126639 A1 | * | 6/2011 | Behrens | .................. G01L 3/104 73/862.193 |
| 2016/0138983 A1 | * | 5/2016 | Ikeda | ................. B62D 15/0215 73/862.193 |

FOREIGN PATENT DOCUMENTS

| | | |
|---|---|---|
| DE | 102012200244 A1 | 7/2013 |
| EP | 0952660 A2 | 10/1999 |
| EP | 0952660 A3 | 8/2000 |
| EP | 2730902 A1 | 5/2014 |
| EP | 2778642 A2 | 9/2014 |
| EP | 2778642 A3 | 10/2014 |
| JP | 2010019718 A | 1/2010 |

OTHER PUBLICATIONS

Extended European search report for related European application No. 16153801.2, dated Jul. 13, 2016 (9 pages).

\* cited by examiner

*Primary Examiner* — Lisa Caputo
*Assistant Examiner* — Roger Hernandez-Prewitt
(74) *Attorney, Agent, or Firm* — Cantor Colburn LLP

(57) ABSTRACT

The invention relates to a torque sensor assembly with an upper rotor mounted on an upper shaft axially disposed about a rotational axis, an outer lower rotor axially disposed about the rotational axis, an inner lower rotor axially disposed about the rotational axis between the upper rotor and the outer lower rotor, and at least one probe positioned between the outer lower rotor and the inner lower rotor, the at least one probe measures flux generated by the upper rotor and directed by the outer lower rotor and the inner lower rotor.

17 Claims, 7 Drawing Sheets

AXIAL FLUX FOCUSING SMALL DIAMETER LOW COST TORQUE SENSOR

BACKGROUND OF THE INVENTION

The invention relates to an axial flux focusing torque sensor. Non-contacting torque sensors generate output voltage corresponding to the relative angular displacement between an upper and lower shaft connected by a torsion bar. From the output voltage, a control system measures a steering assist value provided to the vehicle. Conventional torque sensors typically rely on a radial flux focusing magnet arrangements, where radially oriented magnets are placed in the upper rotor. Lower rotors are placed radially outside the upper rotor, increasing the overall diameter of the torque sensor. Additionally, the placement of the lower rotors radially outside the upper rotor introduces inherent noise in the sensor output.

Alternatively, torque sensors with axially magnetized magnets in the upper rotor and concentric coaxial ferromagnetic rings of different radii in the lower rotor have a large variation of the radial flux density between the ferromagnetic rings. This type of design is highly sensitive to the placement of a magnetic flux sensing element in between the ferromagnetic rings.

SUMMARY OF THE INVENTION

In one aspect of the invention, a torque sensor assembly comprises an upper rotor mounted on an upper shaft disposed about a rotational axis, the upper rotor comprising a plurality of magnets disposed within a non-magnetic structure of the upper rotor, an outer lower rotor axially disposed about the rotational axis, an inner lower rotor axially disposed about the rotational axis between the upper rotor and the outer lower rotor, and at least one probe positioned between the outer lower rotor and the inner lower rotor, the at least one probe measures axial flux generated by the upper rotor and directed by the outer lower rotor and the inner lower rotor.

In another aspect of the invention, a torque sensor assembly comprises an upper rotor mounted on an upper shaft axially disposed about a rotational axis, the upper rotor comprising a plurality of magnetic zones, an outer lower rotor axially disposed about the rotational axis, an inner lower rotor axially disposed about the rotational axis between the upper rotor and the outer lower rotor, and at least one probe positioned between the outer lower rotor and the inner lower rotor, the at least one probe measures axial flux generated by the upper rotor and directed at least in part by the outer lower rotor and the inner lower rotor.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
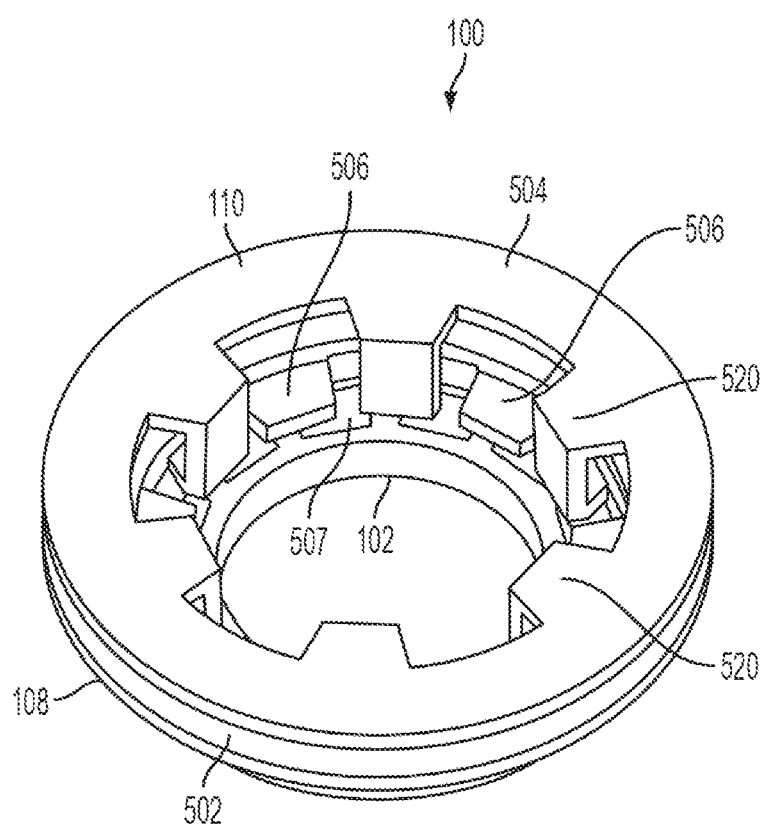
FIG. 1 is an isometric view of a torque sensor in accordance with one embodiment of the invention.

Referring now to FIG. 1, a small diameter torque sensor 100 in accordance with one embodiment of the invention is illustrated. As shown in FIG. 1, the small diameter torque sensor 100 comprises an upper rotor 102, an inner lower rotor 108 and an outer lower rotor 110. The upper rotor 102, the inner lower rotor 108 and the outer lower rotor 110 are axially disposed about a rotational axis. As described in more detailed below, axial flux is generated by the upper rotor 102 and directed at least in part by the inner lower rotor 108 and the outer lower rotor 110. The relative angular displacement of the upper rotor 102, inner lower rotor 108, and the outer lower rotor 110 cause measurable changes in axial flux density.

Figure 2:
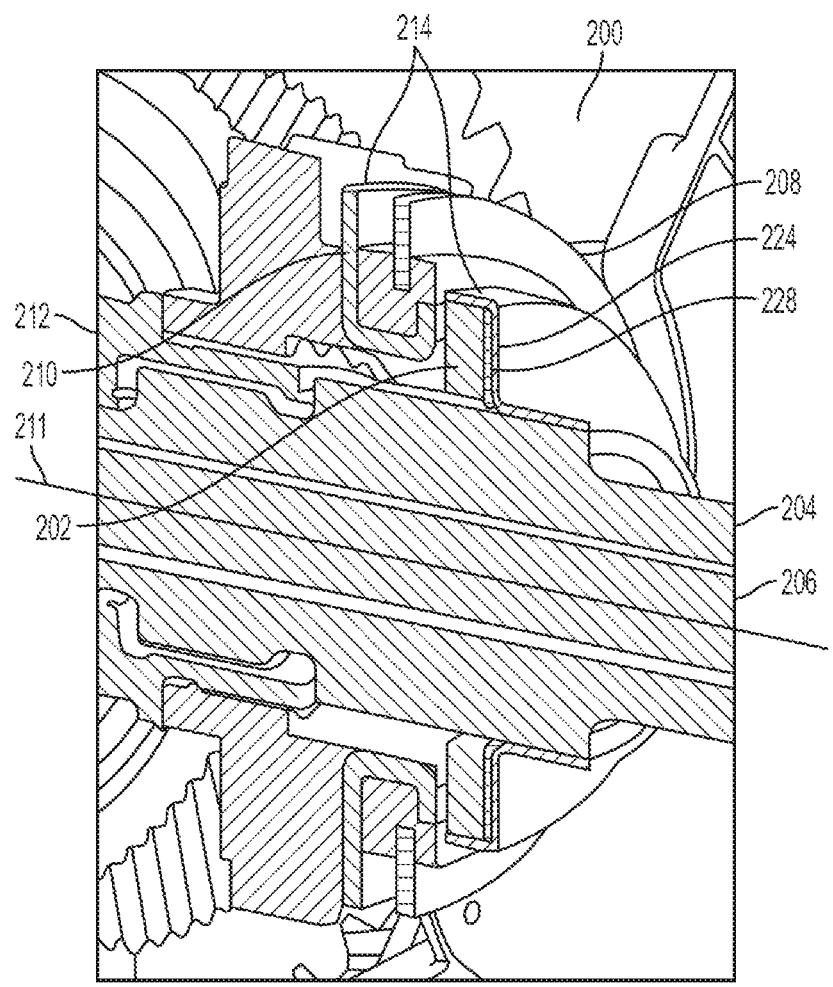
FIG. 2 is a cross-sectional isometric view of the torque sensor in accordance with one embodiment of the invention.

Referring now to FIG. 2, a cross-sectional view of a small diameter torque sensor 200 in accordance with one embodiment of the invention is illustrated. As shown in FIG. 2, the small diameter torque sensor 200 comprises an upper rotor 202 attached to an upper shaft 204 of an axle 206. The small diameter torque sensor 200 further comprises an inner lower rotor 208 and an outer lower rotor 210 that are attached to a lower shaft 212 of the axle 206. The upper rotor 202, the inner lower rotor 208 and the outer lower rotor 210 are disposed about a rotational axis 211. The upper shaft 204 and the lower shaft 212 are rotatably attached with a torsion bar, and rotate about the rotational axis 211.

The inner lower rotor 208 and the outer lower rotor 210 are attached the lower shaft 212 by a holding structure 214. In this embodiment, the holding structure 214 is a two-piece design. However, the holding structure 214 can be a single piece design with a single holding structure.

The holding structure 214 holds the inner lower rotor 208 and the outer lower rotor 210 to separate the inner lower rotor 208 and the outer lower rotor 210 in an axial direction. A sensing probe (not shown) can be placed between the inner lower rotor 208 and the outer lower rotor 210.

In this embodiment, the lower holding structure 214 is formed with an unmagnetized, non-magnetic material such as plastic. Additionally, in this embodiment, the upper rotor 202 comprises a back iron 228 that forms the radially-outward facing surface 224 of the upper rotor 202. In one embodiment, the upper rotor 202 comprises magnets circumferentially disposed within a non-magnetic structure of the upper rotor 202.

In operation, the movement of the upper shaft 204 relative to the lower shaft 212 generates movement of the upper rotor 202 relative to the inner lower rotor 208 and the outer lower rotor 210. Flux travels axially from the upper rotor 202 to the inner lower rotor 208 and the outer lower rotor 210, where the flux is directed at least in part by the inner lower rotor 208 and the outer lower rotor 210.

The magnetic arrangement of the upper rotor 202 along with the structure of the inner lower rotor 208 and the outer lower rotor 210 causes the flux to travel back to the upper rotor 202 in an axial direction. A probe (not shown in FIG. 2) of the small diameter torque sensor 200 is positioned between the inner lower rotor 208 and the outer lower rotor 210 to measure changes in flux density generated by the relative angular displacement of the upper rotor 202 relative to the inner lower rotor 208 and the outer lower rotor 210. Torque can be determined based on the measured flux density.

Figure 3:
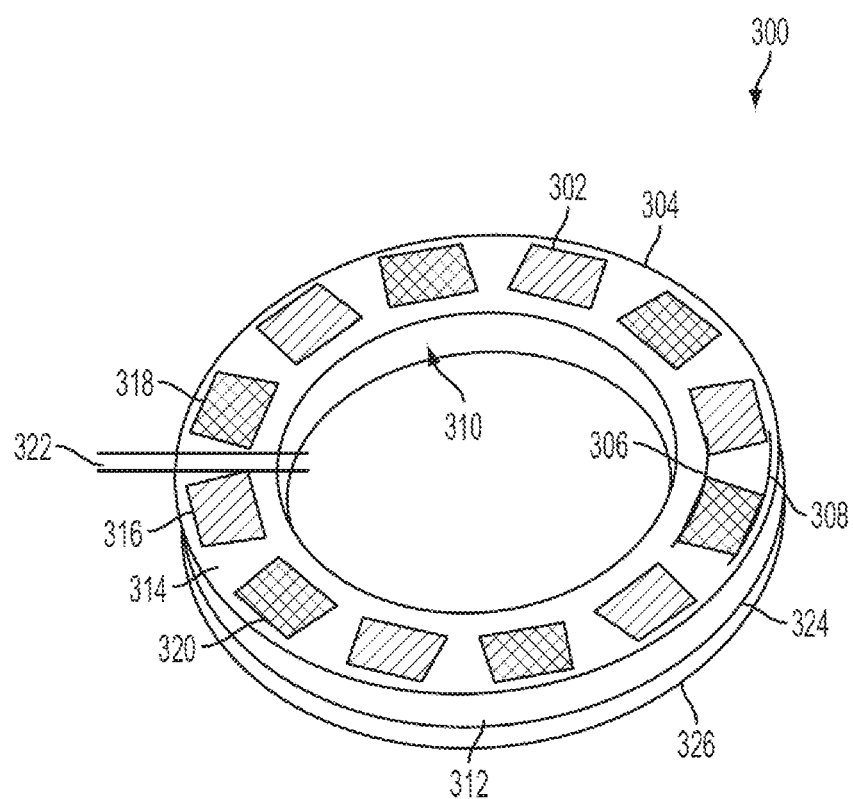
FIG. 3 is an isometric view of an upper rotor in accordance with one embodiment of the invention.

FIG. 3 shows an exemplary embodiment of an upper rotor 300 in accordance with one embodiment of the invention. The upper rotor 300 comprises a plurality of magnets 302 circumferentially disposed about the upper rotor 300. In this embodiment, the plurality of magnets 302 is disposed within a non-magnetic structure 304 of the upper rotor 300, between a minor circumference 306 and a major circumference 308 of the upper rotor 300. In this embodiment, both the minor circumference 306 and the major circumference 308 are spaced at radial distances between a radially inward facing surface 310 and a radially outward facing surface 312 of the upper rotor 300. In this embodiment, a back iron 326 is attached to the radially outward facing surface 312.

At least one magnet 316 of the plurality of magnets 302 of the upper rotor 300 is axially magnetized. Accordingly, flux paths travel axially from an axially inward upper rotor surface 314 of the upper rotor 300 that is adjacent to the inner lower rotor 208. In this embodiment, the plurality of magnets 302 are spaced apart, defining a magnet spacing distance 322 with respect to adjacent magnet 318 and magnet 316.

Additionally, magnet 316 of the plurality of magnets 302 extends axially through the upper rotor 300, forming a portion of an axially outward upper rotor surface 324. In this embodiment, at least one magnet 316 of the plurality of magnets 302 is trapezoidal-shaped, as viewed axially, to minimize flux leakage. However, in other embodiments, at least one magnet 316 of the plurality of magnets 302 can be rectangular shaped, circular shaped, and other shapes.

The poles of magnets of the plurality of magnets 302 disposed in the upper rotor 300 differ. For example, if magnet 316 has a south magnetization, adjacent magnets 318, 320, located circumferentially adjacent to magnet 316 have a north magnetization. Alternatively, if magnet 316 has a north magnetization, adjacent magnets 318, 320 located circumferentially adjacent to magnet 316 have a south magnetization. The alternation of the polarity of adjacent magnets 318, 320 promotes flux travel in a measurable direction. Additionally, at least one magnet 316 of the plurality of magnets 302 can be formed into the non-magnetic structure 304, or sintered and bonded to the non-magnetic structure 304.

Figure 4:
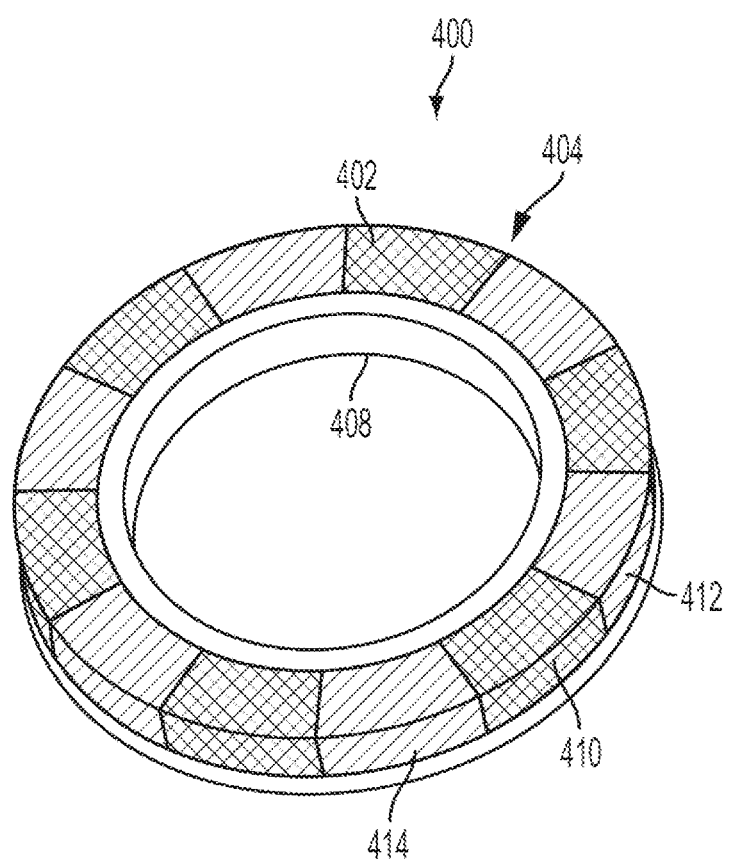
FIG. 4 is an isometric view of an upper rotor in accordance with another embodiment of the invention.

An upper rotor 400 in accordance with another embodiment of the invention is shown in FIG. 4. The upper rotor 400 comprises an magnetic ring 402 and a ringed non-magnetic structure 408. The magnetic ring 402 has a plurality of magnetic zones 404 circumferentially disposed about the magnetic ring 402. In this embodiment, the magnetic ring 402 is a single-piece structure. In another embodiment, the magnetic ring 402 is formed with bonded magnets that correspond to the plurality of magnetic zones 404. In this embodiment, a ringed non-magnetic structure 408 of the upper rotor 400 is located radially inward from the magnetic ring 402 and attached to the magnetic ring 402.

At least one magnetic zone 410 of the plurality of magnetic zones 404 of the magnetic ring 402 is axially magnetized. The poles of adjacent magnetic zones 412, 414 to magnetic zone 410 differ. Thus, if magnetic zone 410 has a south magnetization, the adjacent magnetic zones 412, 414 located circumferentially adjacent to the magnetic zone 410 have a north magnetization, and vice-versa.

Figure 5:
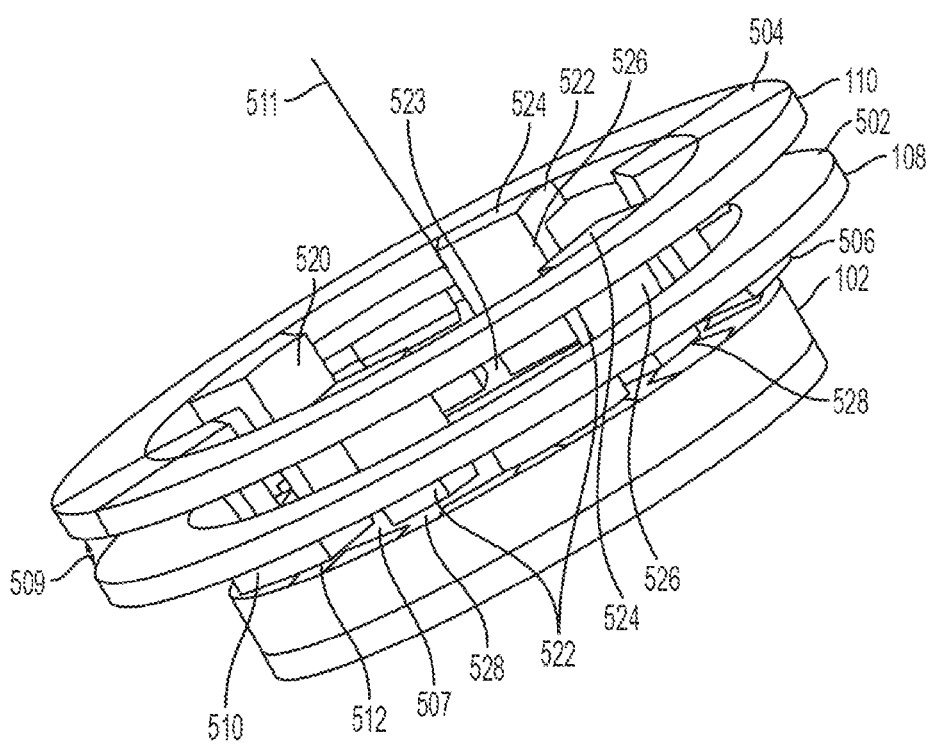
FIG. 5 is a second isometric view of the torque sensor in accordance with one embodiment of the invention.

FIG. 5 illustrates an isometric view of the inner lower rotor 108 and the outer lower rotor 110 in accordance with one embodiment of the invention. The inner lower rotor 108 is arranged between the outer lower rotor 110 and the upper rotor 102 along a rotational axis 511. A measurement space 509 is formed between the inner lower rotor 108 and the outer lower rotor 110.

The inner lower rotor 108 comprises an inner ringed frame 502 and the outer lower rotor 110 comprises an outer ringed frame 504 (also see FIG. 1). A plurality of teeth 506 is circumferentially disposed around the inner lower rotor 108, defining a plurality of gaps 507 between the plurality of teeth 506. The plurality of teeth 506 extend radially inward from the inner ringed frame 502 (also see FIG. 1).

In this embodiment, at least one tooth 510 of the plurality of teeth 506 attaches to the inner ringed frame 502, extending radially inward. In another embodiment, tooth 510 comprises an arced surface that extends axially toward the upper rotor 102, and a straight surface that extends radially inward from the arced surface. The arced surface of tooth 510 provides an offset from the inner ringed frame 502 in an axial direction, toward the upper rotor 102.

A plurality of u-shaped teeth 520 circumferentially disposed about the outer lower rotor 110 extend from the outer ringed frame 504 (also see FIG. 1). At least one u-shaped tooth 522 of the plurality of u-shaped teeth 520 is circumferentially disposed within at least one gap 523 of the plurality of gaps 507 defined by the plurality of teeth 506 of the inner lower rotor 108.

At least one u-shaped tooth 522 of the plurality of u-shaped teeth 520 comprises an outer tooth surface 524 that extends radially inward from the outer ringed frame 504 of the outer lower rotor 110. U-shaped tooth 522 further comprises a channeled surface 526 that extends axially from the outer tooth surface 524 toward the inner lower rotor 108. An inner tooth surface 528 of u-shaped tooth 522 extends radially outward. The channeled surface 526 extends to axially align the inner tooth surface 528 of u-shaped tooth 522 with the straight surface 512 of tooth 510 of the inner lower rotor 108.

Figure 6:
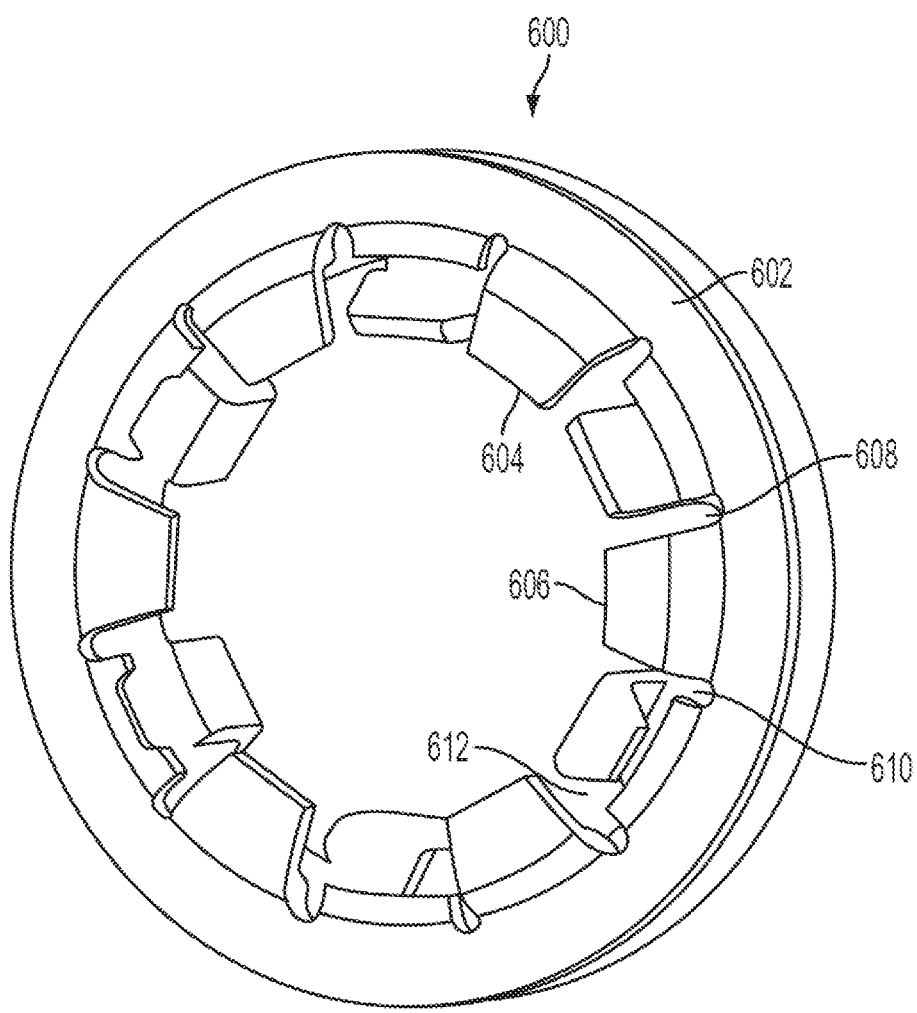
FIG. 6 is a view of an inner lower rotor and an outer lower rotor in accordance with one embodiment of the invention.

FIG. 6 shows another embodiment of an inner lower rotor 600. The inner lower rotor 600 comprises a notched inner ringed frame 602. The notched inner ringed frame 602 comprises a plurality teeth 604 circumferentially disposed around the notched inner ringed frame 602. Adjacent to at least one tooth 606 of the plurality of teeth 604, notches 608, 610 are formed adjacent to the at least one tooth 606, forming the notched inner ringed frame 602. The notches 608, 610 define a plurality of stubbed inner teeth 612 of the inner lower rotor 600.

Figure 7:
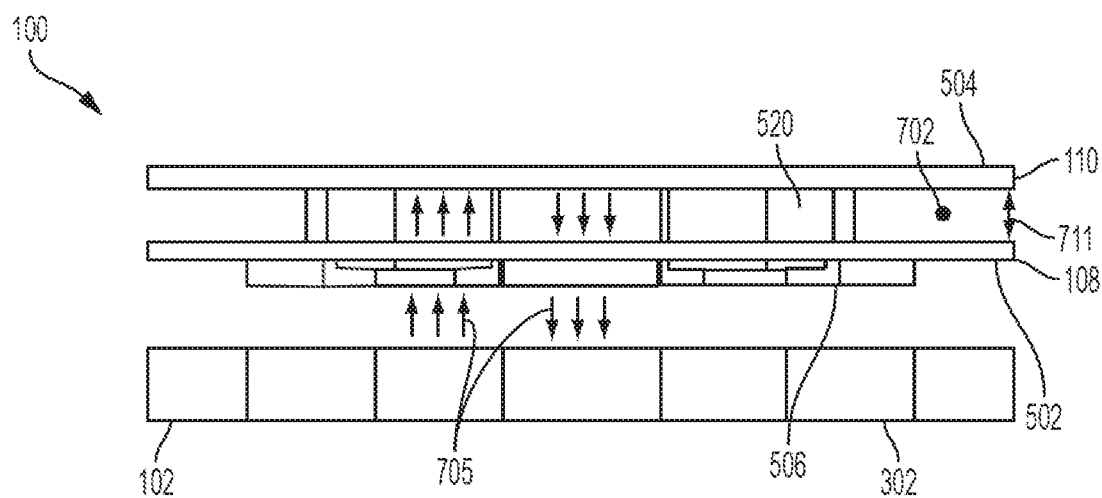
FIG. 7 is a cross-sectional view of the torque sensor with emphasized flux patterns in accordance with one embodiment of the invention.

FIG. 7 shows a side view of the small diameter torque sensor 100 in accordance with one-embodiment of the invention. A probe 702 disposed in the measurement space 711 formed between the inner lower rotor 108 and the outer lower rotor 110. In this embodiment, the probe 702 is placed adjacent to the inner ringed frame 502 and the outer ringed frame 504. The upper rotor 102 generates flux that travels in a direction of the inner lower rotor 108 and the outer lower rotor 110 shown by arrows 705.

The flux is generated at least in part due to the axial magnetization of the plurality of magnets 302 of the upper rotor 102, and the relative angular displacement of the upper rotor 102 with respect to the inner lower rotor 108 and the outer lower rotor 110. The plurality of teeth 506 of the inner lower rotor 108 and the plurality of u-shaped teeth 520 of outer lower rotor 110 direct the flux toward the probe 702 for measurement by the probe 702. The flux travels at least in part through the measurement space 711.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A torque sensor assembly comprising:
   an upper rotor mounted on an upper shaft axially disposed about a rotational axis, the upper rotor comprising a plurality of magnets disposed within a non-magnetic structure of the upper rotor;
   an outer lower rotor axially disposed about the rotational axis;
   an inner lower rotor axially disposed about the rotational axis between the upper rotor and the outer lower rotor; and
   at least one probe located radially outward from the rotational axis and axially inbetween the outer lower rotor and the inner lower rotor, the at least one probe measures axial flux generated by the upper rotor and directed by the outer lower rotor and the inner lower rotor.

2. The torque sensor assembly of claim 1, wherein at least one magnet of the plurality of magnets is axially magnetized.

3. The torque sensor assembly of claim 2, wherein the at least one magnet is trapezoidal shaped.

4. The torque sensor assembly of claim 3, wherein the at least one magnet has an opposite pole of adjacent magnets.

5. A torque sensor assembly comprising:
   an upper rotor mounted on an upper shaft axially disposed about a rotational axis, the upper rotor comprising a plurality of magnets disposed within a non-magnetic structure of the upper rotor;
   an outer lower rotor axially disposed about the rotational axis;
   an inner lower rotor axially disposed about the rotational axis between the upper rotor and the outer lower rotor; and
   at least one probe positioned axially between the outer lower rotor and the inner lower rotor, the at least one probe measures axial flux generated by the upper rotor and directed by the outer lower rotor and the inner lower rotor, wherein the inner lower rotor comprises an inner ringed frame with a plurality of teeth circumferentially disposed about the inner ringed frame to define a plurality of gaps between the plurality of teeth, at least a portion of at least one tooth of the plurality of teeth extends radially inward, a portion of the at least one tooth is arced, and the outer lower rotor comprises an outer ringed frame with a plurality of u-shaped teeth circumferentially disposed about and attached to the outer ringed frame, wherein at least one u-shaped tooth of the plurality of u-shaped teeth is circumferentially disposed within each gap of the plurality of gaps.

6. The torque sensor assembly of claim 5, wherein the at least one u-shaped tooth comprises an outer tooth surface that extends radially inward from the outer ringed frame, a channeled surface that axially extends from the outer tooth surface toward the inner lower rotor, and an outer tooth surface that extends radially outward from the channeled surface.

7. The torque sensor assembly of claim 6, wherein the outer tooth surface that extends radially outward and the portion of the at least one tooth that extends radially inward align axially.

8. A torque sensor assembly comprising:
   an upper rotor mounted on an upper shaft and axially disposed about a rotational axis, the upper rotor comprising a plurality of magnetic zones;
   an outer lower rotor axially disposed about the rotational axis;
   an inner lower rotor axially disposed about the rotational axis between the upper rotor and the outer lower rotor, wherein the outer lower rotor is at least in-part spaced axially outward from the inner lower rotor; and
   at least one probe located radially outward from the rotational axis and axially inbetween the outer lower rotor and the inner lower rotor, the at least one probe measures axial flux generated by the upper rotor and directed at least in part by the outer lower rotor and the inner lower rotor.

9. The torque sensor assembly of claim 8, wherein the inner lower rotor comprises an inner ringed frame with a plurality of teeth circumferentially disposed about the inner ringed frame to define a plurality of gaps between the plurality of teeth.

10. The torque sensor assembly of claim 9, wherein at least a portion of at least one tooth of the plurality of teeth extends radially inward.

11. The torque sensor assembly of claim 10, wherein a portion of the at least one tooth is arced.

12. The torque sensor assembly of claim 11, wherein the outer lower rotor comprises an outer ringed frame with a plurality of u-shaped teeth circumferentially disposed about and engaged to the outer ringed frame, wherein at least one u-shaped tooth of the plurality of u-shaped teeth is circumferentially disposed within at least one gap of the plurality of gaps.

13. The torque sensor assembly of claim 12, wherein the at least one u-shaped tooth comprises an outer tooth surface that extends radially inward from the inner ringed frame, a channeled surface that axially extends from the outer tooth surface toward the inner lower rotor, and an outer tooth surface that extends radially outward from the channeled surface.

14. The torque sensor assembly of claim 13, wherein the outer tooth surface that extends radially outward and the portion of the at least one tooth that extends radially inward align axially.

15. The torque sensor assembly of claim 8, wherein at least one magnetic zone of the plurality of magnetic zones is axially magnetized.

16. The torque sensor assembly of claim 15, wherein the at least one magnetic zone has an opposite pole of adjacent magnetic zones.

17. A torque sensor assembly comprising:
   a first shaft extending along a rotational axis;
   a second shaft extending along the rotational axis and constructed and arranged to rotate with respect to the first shaft;
   a first rotor attached to the first shaft, and including a plurality of magnets for generating an axial flux;
   a second rotor attached to the second shaft;

an inner rotor attached to the second shaft and spaced axially between the first rotor and at least a portion of the second rotor, wherein the second and inner rotors are constructed and arranged to direct the axial flux; and a probe axially spaced between the second and inner rotors, and configured to measure a change in flux density of the axial flux as a result of rotational displacement between the first and second shafts.

* * * * *